(12) United States Patent
Moore et al.

(10) Patent No.: US 8,566,273 B2
(45) Date of Patent: Oct. 22, 2013

(54) METHOD, SYSTEM, AND COMPUTER PROGRAM FOR INFORMATION RETRIEVAL IN SEMANTIC NETWORKS

(75) Inventors: Joshua Lamar Moore, Ithaca, NY (US); Florian Steinke, Herrenberg (DE); Volker Tresp, München (DE)

(73) Assignee: Siemens Aktiengesellschaft, Munich (DE)

( * ) Notice: Subject to any disclaimer, the term of this patent is extended or adjusted under 35 U.S.C. 154(b) by 332 days.

(21) Appl. No.: 13/008,084

(22) Filed: Jan. 18, 2011

(65) Prior Publication Data
US 2012/0158639 A1    Jun. 21, 2012

(30) Foreign Application Priority Data
Dec. 15, 2010  (EP) ..................................... 10195051

(51) Int. Cl.
*G06N 5/02*    (2006.01)
(52) U.S. Cl.
USPC ............................................... 706/55; 704/9
(58) Field of Classification Search
USPC ............................................... 706/55; 704/9
See application file for complete search history.

(56) References Cited

U.S. PATENT DOCUMENTS

| | | | |
|---|---|---|---|
| 7,505,989 B2 * | 3/2009 | Gardner et al. ........................ 1/1 |
| 2005/0060306 A1 * | 3/2005 | Hattori et al. ..................... 707/3 |
| 2008/0001948 A1 * | 1/2008 | Hirsch .......................... 345/440 |
| 2009/0019032 A1 * | 1/2009 | Bundschus et al. ............... 707/5 |
| 2009/0037389 A1 * | 2/2009 | Kothari et al. .................... 707/3 |
| 2010/0161317 A1 * | 6/2010 | Au .................................... 704/9 |
| 2010/0235307 A1 * | 9/2010 | Sweeney et al. ................ 706/12 |

OTHER PUBLICATIONS

Kasneci G. et al., "STAR: Steiner-Tree Approximation in Relationship Graphs", IEEE International Conference on Data Engineering, 2009, pp. 868-879.*
Borge-Holthoefer J. et al., "Semantic Networks: Structure and Dynamics", Entropy 2010, 12, 1264-1302.*
Hofmann T., "Latent Semantic Models for Collaborative Filtering", ACM Transactions on Information Systems, vol. 22, No. 1, Jan. 2004, pp. 89-115.*
Moore J. et al., "A Novel Metric for Information Retrieval in Semantic Networks", ESWC 2011 Workshops, LNCS 7117, pp. 65-79.*
Pirro G., "A semantic similarity metric combining features and intrinsic information content", Data & Knowledge Engineering 68 (2009) 1289-1308.*
Magatti D. et al., "Combined Structured and Keyword-Based Search in Textually Enriched Entity-Relationship Graphs", AKBC, May 17-19, 2010.*
Akkus G., Semantic Web Services Composition: A Network Analysis Approach, IEEE, 2007, pp. 937-943.*

(Continued)

*Primary Examiner* — Jeffrey A Gaffin
*Assistant Examiner* — Dave Misir
(74) *Attorney, Agent, or Firm* — King & Spalding, L.L.P.

(57) ABSTRACT

A method, system, and computer software for information retrieval in semantic networks, has the steps of: acquiring a graph of interest, assuming a novel metric regarding the acquired graph, specifying a query node of interest on the obtained graph, calculating a shortest-path distance from the query node of interest to a plurality of other nodes on the acquired graph, obtaining a ranked list of nodes based on the calculated shortest-path distance, and displaying for a user the retrieved information.

19 Claims, 3 Drawing Sheets

(56) References Cited

OTHER PUBLICATIONS

Huang C. et al., Keyphrase Extraction using Semantic Networks Structure Analysis, Proceedings of the Sixth International Conference on Data Mining (ICDM '06).*

Brin, S, et al.; "The Anatomy of a Large-Scale Hypertextual Web Search Engine", Computer Networks and ISDN Systems, Computer Science Department, Stanford University, 18 pages, 1998.

Baluja, S. et al.; "Video Suggestion and Discovery for YouTube: Taking Random Walks Through the View Graph", Proceedings of the $17^{th}$ International Conference on World Wide Web, pp. 895-904, Apr. 21, 2008.

Sarkar, P., et al.: "Fast Incremental Proximity Search in Large Graphs", Proceedings of the $25^{th}$ International Conference on Machine Learning, pp. 896-903, 2008.

* cited by examiner

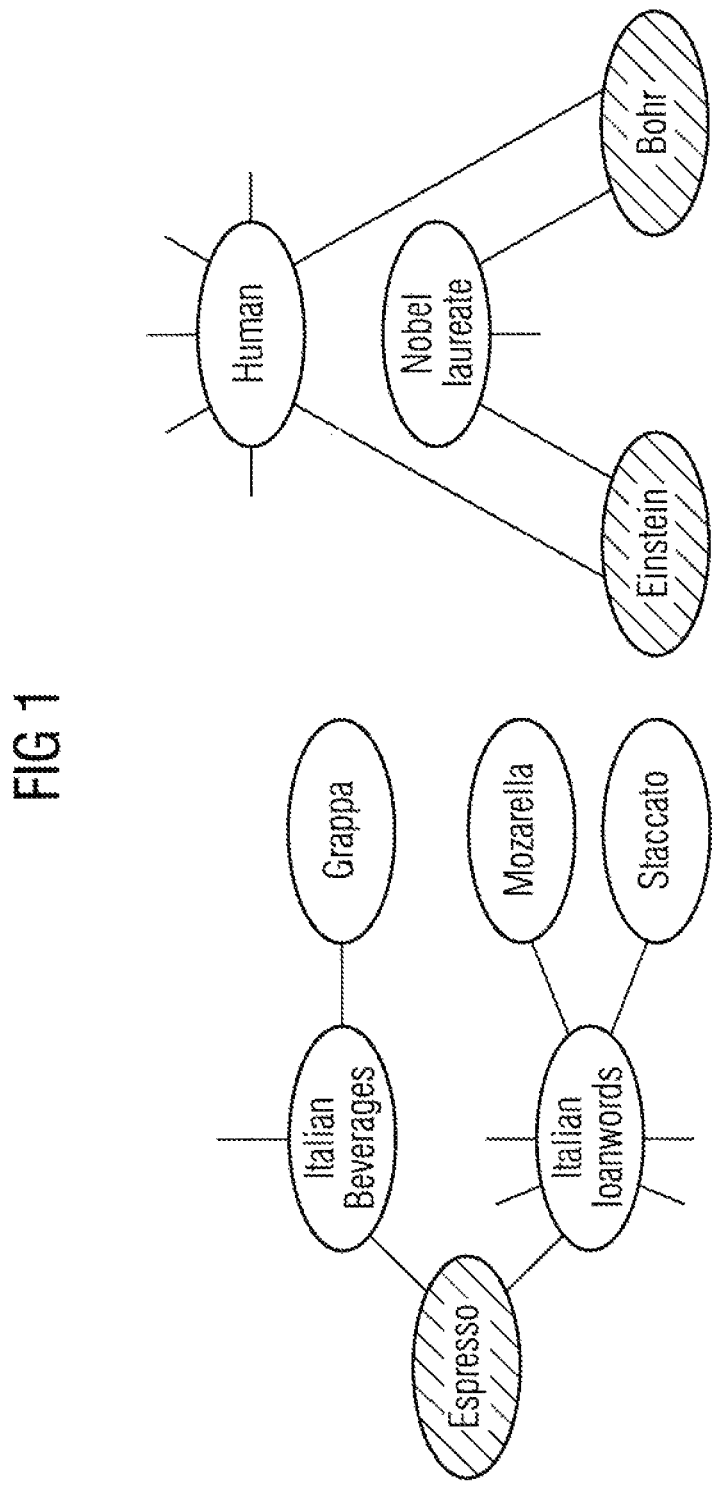

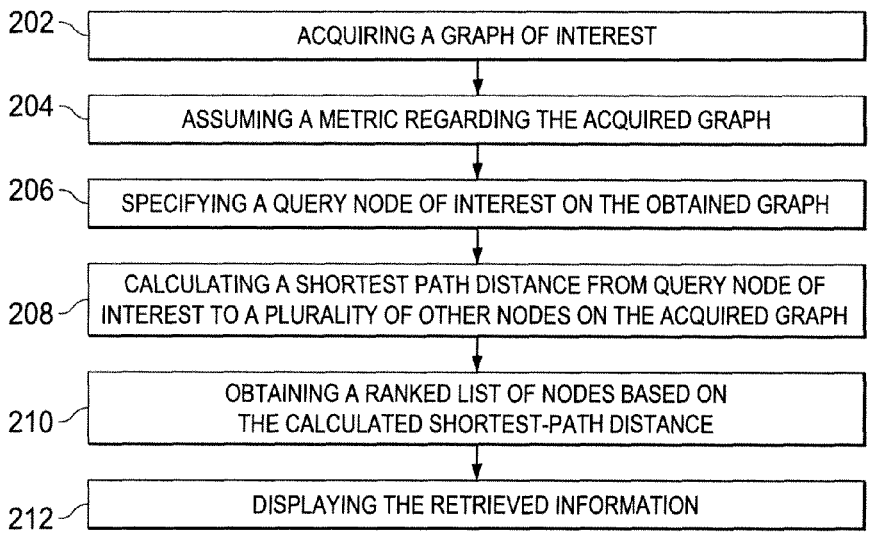
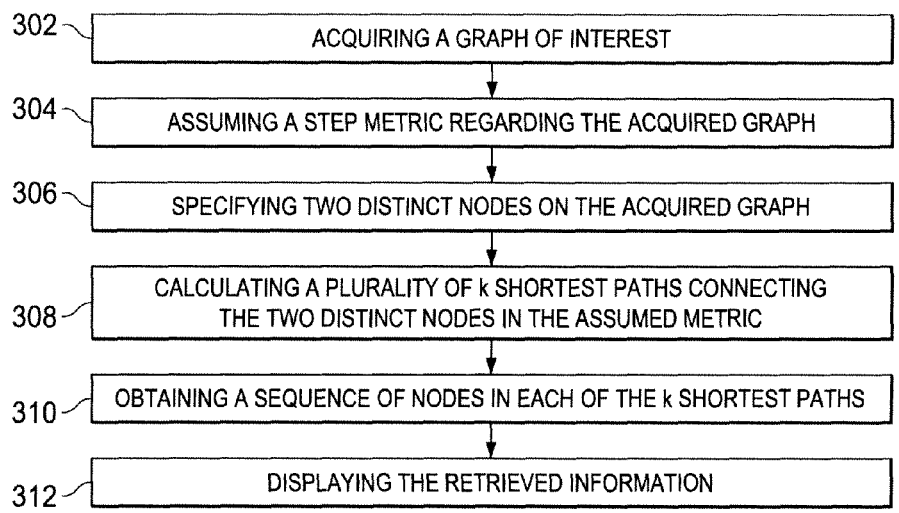

METHOD, SYSTEM, AND COMPUTER PROGRAM FOR INFORMATION RETRIEVAL IN SEMANTIC NETWORKS

CROSS-REFERENCE TO RELATED APPLICATIONS

This application claims priority to EP Patent Application No. 10195051 filed Dec. 15, 2010. The contents of which is incorporated herein by reference in its entirety.

TECHNICAL FIELD

The present invention is directed to a metric, method, system and computer program for information retrieval in semantic networks. More specifically, the present invention is directed to a graph metric for semantic entity-relationship networks, a method and system employing the graph metric, and a computer program product for information retrieval in semantic networks employing the graph metric.

BACKGROUND

Large entity-relationship graphs have recently become available on the semantic web. Sources like DBpedia, YAGO, OpenCyc or Linked Life Data encode useful information on large scale, and simple and efficient information retrieval methods for these data sources are a pressing need.

SUMMARY

According to various embodiments, a solution to the above problems is provided by methods for information retrieval in semantic networks, a system for information retrieval in semantic networks, and a computer program product for information retrieval in semantic networks.

In accordance with a first aspect, a method for information retrieval in semantic networks is proposed that comprises acquiring a graph of interest, assuming a metric regarding the acquired graph, specifying a query node of interest on the obtained graph, calculating a shortest-path distance from the query node of interest to a plurality of other nodes on the acquired graph, obtaining a ranked list of nodes based on the calculated shortest-path distance, and displaying for a user the retrieved information.

In accordance with another aspect, a method for information retrieval in semantic networks is proposed, comprising acquiring a graph of interest, assuming a metric regarding the acquired graph, specifying two distinct nodes on said acquired graph, calculating a plurality of k-shortest paths connecting said two distinct nodes in the assumed metric, obtaining a sequence of nodes in each of the k shortest paths, and displaying for a user the retrieved information.

In accordance with a further aspect, a system for information retrieval in semantic networks is proposed, comprising at least a data bus system, a memory coupled to the data bus system, wherein the memory includes computer usable program code, a processing unit coupled to the data bus system, wherein the processing unit executes the computer usable program code to acquire a graph of interest, assume a metric regarding the acquired graph, specify a query node of interest on the obtained graph, calculate a shortest-path distance from the query node of interest to a plurality of other nodes on the acquired graph, obtain a ranked list of nodes based on the calculated shortest-path distance, and display for a user the retrieved information. The proposed system for information retrieval in semantic networks may also comprise at least a data bus system, a memory coupled to the data bus system, wherein the memory includes computer usable program code, a processing unit coupled to the data bus system, wherein the processing unit executes the computer usable program code to acquire a graph of interest, assume a metric regarding the acquired graph, specify two distinct nodes on the acquired graph, calculate a plurality of k-shortest paths connecting the two distinct nodes in the assumed metric, obtaining a sequence of nodes in each of the k shortest paths, and displaying for a user the retrieved information.

In accordance with yet a further aspect, a computer program product for information retrieval in semantic networks is proposed, comprising a tangible computer usable medium including computer usable program code for performing diagnosis detection in a system, the computer usable program code being used for acquiring a graph of interest, assuming a metric regarding the acquired graph, specifying a query node of interest on the obtained graph, calculating a shortest-path distance from the query node of interest to a plurality of other nodes on the acquired graph, obtaining a ranked list of nodes based on the calculated shortest-path distance, and displaying for a user the retrieved information. The computer program product for information retrieval in semantic networks, in accordance with various embodiments also comprises a tangible computer usable medium including computer usable program code for performing diagnosis detection in a system, the computer usable program code being used for acquiring a graph of interest, assuming a metric regarding the acquired graph, specifying two distinct nodes on said acquired graph, calculating a plurality of k-shortest paths connecting said two distinct nodes in the assumed metric, obtaining a sequence of nodes in each of the k shortest paths, and displaying for a user the retrieved information.

In accordance with various embodiments, the method can be further characterised by the graph of interest being acquired by at least one of downloading, and constructing the graph from a collection of databases. If the graph is acquired via making an election based on the interest of the user, making an election based on the interest of the user is based on least one of a problem domain, and a search domain. The query node of interest is specified on the acquired graph via a search engine or it is manually chosen. The graph metric is defined via deg(u)+deg(v) or via log(deg(u))+log(deg(v)). The ranked list of nodes is ordered by the shortest distance in this metric to the query node.

The method for information retrieval in semantic networks according to various embodiments can further be characterized by the determination of the path between the two nodes describing the relationship between the two nodes.

Other characteristics and advantages of the various embodiments will be apparent in connection with the following description.

BRIEF DESCRIPTION OF THE DRAWINGS

For a more complete understanding of the various embodiments, the objects and advantages thereof, reference is now made to the following descriptions taken in conjunction with the accompanying drawings, in which:

FIG. 1 illustrates stylized examples of the proposed tasks;

FIG. 2 is a flow chart representation of the method for information retrieval in semantic networks, in accordance with an embodiment.

FIG. 3 is a flow chart representation of the method for information retrieval in semantic networks, in accordance with another embodiment.

Figure 4:
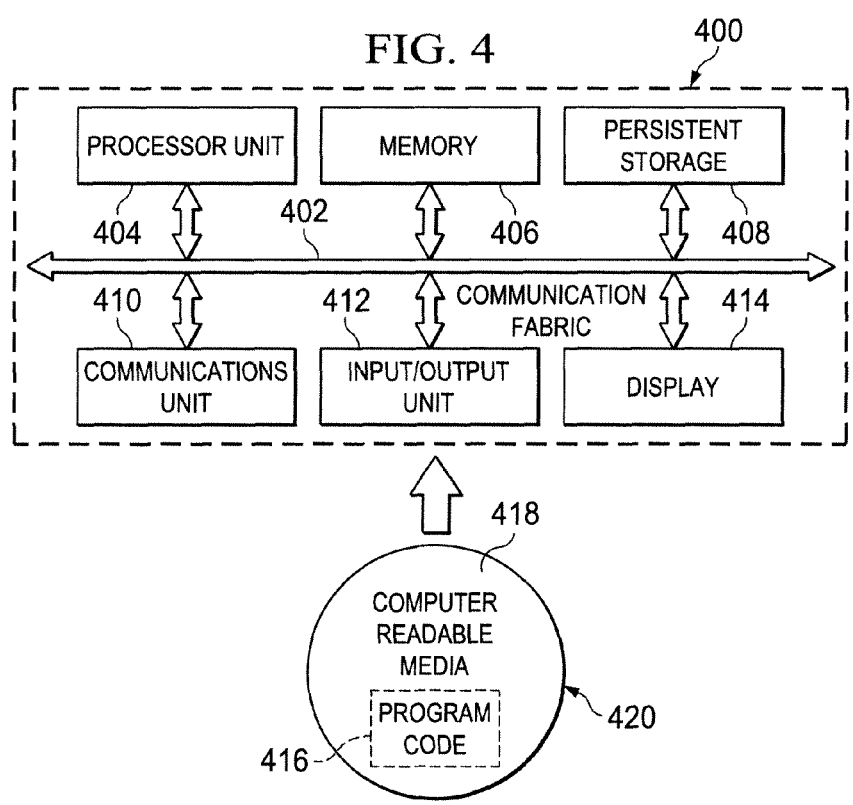
FIG. 4 is an embodiment of a data processing system in which a method for information retrieval in semantic networks application may be implemented.

Non-limiting and non-exhaustive embodiments are described with reference to the above referenced figures, wherein like reference numerals refer to like parts throughout the various views unless otherwise specified. The order of description should not be construed as to imply that these operations are necessarily order-dependent.

The understanding of the various embodiments is also facilitated by the following tables, tables that constitute an integral part of the description:

Table 1. Basic statistics of the used datasets.

Table 2. Top 30 results of neighborhood search for query node "Espresso" in DBpedia, along with the distances from the query node.

Table 3. Top 30 results of neighborhood search for query node "iPod" in DBpedia.

Table 4. Top 30 results of neighborhood search for query node "machine learning" in OpenCyc.

Table 5. Top 30 results of neighborhood search for query node "quantum physics" in the OpenCyc dataset.

Table 6. The five shortest paths connecting the nodes "Natural language processing" and "Machine learning" in the DBPedia dataset using the metric proposed by the various embodiments.

Table 7. Shortest path finding between the terms "Computer vision" and "machine learning" in DBpedia.

DETAILED DESCRIPTION

Regarding a given entity-relationship graph, there are many questions to be answered. In the present document by an entity-relationship graph is understood a graph where nodes represent physical or abstract objects and the typed edges encode a certain relationship.

The various embodiments focus on providing an answer to the following two questions: First, given an entity node in the graph, representing for example a person or a category in DBpedia, which other nodes in the graph represent entities that are most likely to be useful in the context of the given query node? The answers might be other persons, organizations or concepts that could be used to refine or extend an interactive search session. For the second question, consider selecting two distinct nodes from the graph and asking through which means they are related in the graph. For example, via which people or concepts might Albert Einstein and Niels Bohr be related within DBpedia. Should such a question be asked in the field of bioinformatics, such a link query between genes and diseases might well be used to discover unknown pathways from the existing literature, given that such knowledge is extracted into semantic graph form.

The two stated question/tasks can both be solved with shortest-path search on the entity-relationship graph. A step metric is assumed, for example every edge in the graph is assigned a unit cost, and the shortest-path distance from the query node to all other nodes for the first task is computed, e.g. using Dijkstra's algorithm, or the k-shortest paths connecting the two given nodes for the second task are computed, for example by using a k-shortest path algorithm.

While this solution is straight-forward and efficient to implement, it often returns highly irrelevant results. Consider for example a graph which contains a vertex which is connected to nearly all other vertices such as a broad category that encompasses most entities in the graph. In the first problem defined, this method would return the high-degree vertex with high ranking for almost any vertex queried. This lack of discrimination greatly reduces the utility of the context search, since such a broad topic would lack very much specific relevance to any one article represented in the graph. Furthermore, most of the vertices in the graph would be returned with distance two, even though many of them either are unrelated to the query or are only tenuously related to it. In the second problem, consider a database in which every person listed is connected by an edge in the graph to a node that identifies them as human. In this case, the fact that Einstein and Bohr are both humans would be much less informative than the fact that they are both Nobel laureates, but the "human" and "Nobel laureates" nodes would have equal ranking if no further information were used. These problems are schematically depicted in FIG. 1.

Referring now to FIG. 1, FIG. 1 represents stylized examples of the two proposed tasks with data from DBpedia and the challenges associated with them. In both examples there are links of equal length which are of very different informative value. Paths through nodes with many links are often too broad to be informative. Query nodes are marked shaded, and the black lines denote links to nodes which are not depicted.

One way to allow for differently weighted nodes is to transfer PageRank like concepts described in detail by S. Brin and L. Page in "The anatomy of a large-scale hypertextual Web search engine", Computer networks and ISDN systems, 107-117, 1998 to entity-relationship (ER) graphs. However, a straightforward implementation of this might actually have an adverse effect in the problem setting of the various embodiments: nodes are deemed popular and thus important if many links point to them. Thus high-level nodes which are highly connected become ever more important, although they are often not informative as argued above.

Another approach is to use properties of random walks on graphs. Specifically, it has been argued that the commute time between nodes in an ER graph might be a useful distance measure to find relevant neighboring nodes. In each step, the random walk jumps from one node to an arbitrary neighboring node, and the commute time is the expected number of time steps that a random walk starting from one node will take to reach another before returning to the first node. Using this metric, the problems encountered with the step distance are alleviated in that the commute distance decreases not only if there is a short path between two nodes, but also if there are several short paths between them.

Thus, a single link over a highly general categorical node is not likely to yield a small distance. Moreover, if two nodes are connected by a path which contains a node of high degree, a random walk is likely to "get lost" at the high degree node, taking steps into unrelated regions of the graph, thus increasing the commute time between the two nodes of interest.

While these are strong intuitive arguments in favor of the commute distance, the distance is very difficult to compute. There exists an exact, analytic formula for the commute distance in terms of the pseudoinverse of the graph Laplacian. This, however, is computationally prohibitive for the large graphs encountered in semantic web. The pseudoinverse of the sparse graph Laplacian matrix is in general not sparse, and a square matrix of size of the number of nodes in the graph can typically not be stored or worked with efficiently. More efficient approximations of the commute distance have been developed for citation graphs. Their method, however, still needs 4 seconds per query for a graph of 600 k nodes, which is only a moderate size in the context of the semantic web. Moreover, it is not clear how it would perform on structurally more complex graphs such as DBpedia.

In order to combine the simplicity and speed of simple shortest path finding with the intuitive properties of the commute distance, the various embodiments propose a novel approach. The various embodiments also propose performing shortest path finding, but with a problem adapted graph metric that assigns to each edge a weight that is dependent on the degrees of its endpoints. Finding shortest paths in accordance with various embodiments can be interpreted in terms of maximizing the log likelihood of the path between the two vertices in a random walk on the graph. It can be seen as an optimally adapted first order approximation to the commute distance, and thus experimentally inherits many of the favorable properties of the commute distance. At the same time the computations are very efficient since they reduce to purely local shortest path searches that can be performed with standard graph algorithms.

In the following it will be described exactly how to solve the two proposed tasks. Further, in the present document the proposed method will be described in terms of random walks, and how it can be seen as an approximation of the commute distance. Further yet, it will be shown a number of examples and a numeric evaluation on several semantic datasets, demonstrating the superior behavior both in comparison to the step distance path finding approach and to another simple approximation of the commute distance.

The semantic ER graph may be represented as G=(V, E), where V is the set of nodes or entities, and E is the set of edges or relations holding between the entities. Distinction is not made between different relation types for the edges, they are all treated equally. Moreover, the graphs are also symmetrized, since the semantic direction of a relation statement is often not syntactically obvious, for example, "buys" or "is bought by" might both appear in a graph.

For each edge (u,v)∈E, a weight is defined as $$\omega_{(u,v)} = \log(\deg(u)) + \log(\deg(v)), \text{ or } \omega_{(u,v)} = \deg(u) + \deg(v)$$

Where:
$\omega_{(u,v)}$ represents the weight of the edge between nodes u and v, and
deg(u) is the degree of node u and deg(v) is the degree of node v.

If the graph G is connected, then the degree deg(u) of all nodes u is greater than or equal to one and thus $\omega_{(u,v)} \geq 0$ for all (u,v)∈E. The weights are therefore a valid positive semi-definite path metric on G, and the two described questions can be solved using these novel edge weights in standard shortest paths routines.

For the resolution of the first task in accordance with various embodiments, a node is specified as input, and a set of other nodes are retrieved that are ranked based on how relevant and related they are to the query node. The results of this search might include, for example, topics that are contained within the query topic, topics which contain the query node, or topics that are related by common membership within a category or broader topic. In order to solve this task, the shortest path in the metric defined above between the query node and all other nodes is to be obtained, and the results are ranked by the path length. Using Dijkstra's algorithm only the top number of nodes may be retrieved, without actually computing the shortest path to all nodes.

For the resolution of the second task, two distinct nodes are given as input and the determination of the paths between them needs to be made that, ideally, provide insight into the relationship between the two nodes. This might include interesting or distinct ways in which the two nodes are related. This is solved by finding the k shortest paths between the two nodes in the weighted graph, where k is a free parameter. We return the sequence of nodes in each of the k shortest paths.

The proposed metric can be justified intuitively: The distance to high-degree nodes which carry potentially very unspecific information, such as the "human" node, is large. They are thus avoided as long as more specific, low degree nodes are within reach. This also means that the search is effectively carried out by searching in compactly connected, local subgraphs which are assumed to carry context specific information.

As it will be discussed further in the present document in connection with specific examples, the proposed approach yields matches for queried nodes that are highly specific in subject matter and are very appropriate for a search that, for example, wishes to explore a particular academic subject in detail. In addition, the metric proposed according to various embodiments facilitates the discovery of novel, distinct relationships between nodes: vertices that are related to each other in unique way (i.e. there is a path between them that is connected to relatively few other vertices outside of that path) are closer to each other than vertices that are linked by a very common relationship. The proposed approach in accordance with various embodiments only requires standard graph algorithms and is thus simple to implement. It thus also runs very efficiently even for large graphs.

Random walk probabilities also determine the commute time which has been proposed as an information metric on ER graphs before. In contrast to the approach of various embodiments, the commute distance does not only measure whether there is a single high probability connection between two nodes, but also takes into account how many such paths there are.

Since the commute distance uses more of the structure of the graph, it is potentially more robust. However, this comes at a huge computational cost. The solution proposed by various embodiments is by comparison extremely efficient. Still, it can be seen as a first order approximation of the commute distance as it will be discussed bellow.

The commute time C(u; v) between nodes u and v is $$C(u,v) = \sum_{\pi:(\pi_1=u,\ldots\pi_k=v,\ldots\pi_{len(\pi)}=v)} len(\pi)p(\pi)$$

$$= \sum_{\pi} len(\pi) \prod_{i=1}^{len(\pi)-1} deg(\pi_i)^{-1}$$

The sum goes over all paths that start and end at u and visit v in between. Since all terms are positive, a first order lower bound is to take into account only a single such path π, for example $$C(u,v) \geq len(\pi)p(\pi)$$

Whether this is a tight bound depends on how concentrated the path probabilities are on a single term. While there are certainly situations where this is not the case, for many semantic graphs the approximation might be acceptable. This is since the degree of the nodes enters multiplicatively into the sum. Consider query nodes that are both members of two categories of highly different sizes. Then the path through the smaller category and back on the same way is actually quadratically preferred over the one through the larger category.

Given the above lower bound, the optimal lower bound may be found for the commute distance C(u; v). Therefore the path n that contributes the most to the sum above will be determined. This leads to $$\max_{\pi} len(\pi)p(\pi) = \min_{\pi} -\log len(\pi) + \sum_{i=1}^{n-1} \log deg(\pi_i)$$

The second term is additive in the length of the path and quickly dominates the first term whose magnitude increases sub-linearly. At the same time, for paths of equal length only the second term has to be considered for the minimization. Therefore, without a large error, the first term may be neglected in most cases. Moreover, the optimization set may be restricted to those paths that go from u to v and return on the same way. The result will still be a lower bound on the commute distance, and it allows rewrite the problem using the presently proposed metric as:

$$\min 2 \sum_{\substack{i=1 \\ \pi \in P_{u,v}}}^{n-1} \omega_{(\pi_i, \pi_{i+1})}$$

The above is equivalent to the approach proposed by various embodiments up to a constant factor. Therefore, the approach of various embodiments may be interpreted as finding an optimal lower bound to the commute distance, with the advantage that it can be computed very efficiently and with simple standard graph algorithms.

This derivation has involved a number of approximation steps that are not necessarily the tightest ones possible. Yet, the above argument still provides the motivation of why minimizing the proposed objective might be sensible and it allows to derive a computationally advantageous algorithm.

To demonstrate the methods according to various embodiments, two large, real world semantic entity relationship graphs are used, namely DBpedia and OpenCyc. For the DBpedia dataset, it is proposed to combine the category (skos) and the article category data files. From this data is created an unweighted, undirected graph neglecting the different relationship types and directions. Literals are also ignored since they do not add information to the graph structure. Furthermore, the "Concept" node is also discarded to which each category is connected. For the step distance it is assumed that this master node is removed, but as it will be shown below, there are still many other high-level nodes that cause similar problems. Removing these is not as trivial and could lead to unwanted effects on the search results. A graph for the OpenCyc dataset is defined. An overview of the properties of both graphs is given in Table 1, that represents basis statistics of the used data sets.

As baseline methods for our comparisons the following two approaches are proposed:

First, a comparison is made between our method to using shortest paths with the step distance. Second, it is computed a simple approximation of the commute distance. The exact computation of the commute distance on the full graph is intractable, since it requires the graph Laplacian's pseudo-inverse, a matrix that for most graphs is too big to even be stored. Instead, it is assumed that the commute distance is moderately local. For each query, the 1000 closest nodes to the query node are extracted, in step distance, and only use the subgraph spanned by these nodes and the edges between them to compute the commute distance using the analytic formula disclosed by D. J. Klein and M. Randiffc for the calculation of the Resistance distance in the Journal of Mathematical Chemistry, 12(1):81-95, 1993. If the subgraph has only few edges leaving it, the approximation is fairly reasonable. However, if a very unspecific node with many neighbors is among the closest nodes to the query vertex, then it will connect almost any node in the graph to the query by a path of, say, length 2. In this case the selection of the 1000 closest neighbor nodes is arbitrary and not much can be expected from the approximation of the commute distance. The baseline should thus not be regarded as a completely accurate representative of the true commute distance.

In the following a number of example results from the two datasets will be discussed.

In Table 2 are listed the results of a search for the query node "Espresso". In this case, the step distance may be easily misconstrued due to the high-degree neighbor "Italian loanwords." As a result, the majority of the results listed are unrelated Italian terms which refer mostly to music and food. The commute distance approximation returns highly irrelevant words that are also related mostly to food and music, but this is probably due to the nature of the approximation used since most of the 1000 nodes nearest the espresso node are probably also due to the Italian loanwords node. The method according to various embodiments, on the other hand, returns a list of about one third Italian sodas and non-coffee beverages and about two thirds drinks made with espresso or at least coffee, as well as a few other types of terms.

In Table 3 are illustrated the results of another search performed for the term "iPod". As it may be observed, the step distance provides the user various categories relating to hardware or software, and the commute distance mixes these results with a few more specific terms relating to the iPod's function and to the related iPhone. The method according to various embodiments, on the other hand, yields mostly articles relating specifically to variations and functions of the iPod and the iTunes software that is integral to the use of the iPod.

The various embodiments also provide results for the OpenCyc dataset, which is of a slightly different nature. It contains many rather unspecific nodes like "temporally stuff_like thing" which are nice examples of how such high-degree nodes are avoided by the algorithm according to various embodiments. In Table 4 are represented the results of a search for "machine learning".

While the results of the other methods become irrelevant after only the first few matches, in the examples described above and their afferent tables it may be observed that nearly the first half of our results are still relevant to the topic at hand.

In Table 5, where are presented the results for the term "quantum physics" it may be observed the same pattern: while hardly any of the results from the other two methods are very relevant or informative, almost all of the results returned by the method according to various embodiments are highly specific topics that are closely linked with the search topic.

To demonstrate the dramatic computational advantage of the method proposed by various embodiments versus other methods, including even the described approximation of the commute distance, 1000 query nodes were elected at random and a query was performed while using all three methods. The mean run-times on a standard desktop PC as well as the standard deviation for each method is given below:

| Step | Our Approach | Approx. Commute |
|---|---|---|
| 0.13 s (0.07 s) | 0.11 s (0.04 s) | 10.43 s (9.51 s) |

The average run-time for the method according to various embodiments is 0.11 seconds, compared to an average of 10.43 seconds for our approximation of the commute time, a difference of two orders of magnitude. The method according to various embodiments runs approximately as fast as the step distance method.

It is worth noting that the time taken to approximate the commute time was extremely high in some cases. The longest time taken with the commute distance was over one minute, whereas the longest time taken with the method according to various embodiments was only 0.66 seconds. Furthermore, it is also worth considering that the method used to calculate the commute distance is only an approximation using a graph of 1000 nodes. The most computationally intensive step required of the commute distance is the calculation of the pseudo inverse. Since this step requires cubic time to calculate, an attempt to improve the accuracy of the estimate by adding more nodes to the approximation would drastically increase the time required for computation, while an exact computation would be intractable for most practical problems.

As discussed above, the method according to various embodiments may also be applied for path finding. In the following examples of the method proposed by various embodiments will be discussed as applied to the path finding task. The following examples show the novel connections that the method according to various embodiments is able to find between two nodes in a graph such as between two concepts in a semantic network. In addition, the method according to various embodiments is compared to path finding using the step distance to show the advantages that our method has in discovering truly distinct and specific connections between concepts.

In Table 6 are illustrated the five shortest paths found between the nodes "natural language processing" and "machine learning" in the DBPedia graph. As can be observed, these paths provide useful insight into the actual connection between the two subjects. Most of the paths taken fall into the following template: first the query node, then a subject intimately related to the query (or just the category page for the query), a task within the subject, a method from machine learning used to solve it, and finally the subject of machine learning itself. Such as example is very useful for anyone searching, for example, for ways that machine learning is used in natural language processing.

Next, the results of the path-finding method according to various embodiments are compared to those of the step distance path finding method in the case of finding connections between "computer vision" and "machine learning", again with data from DBpedia. The resulting paths are listed in Table 7. Many results of applying the method according to various embodiments provide information regarding the computer vision domain. Although insightful, some of the paths returned by the method have significant intersection with each other. This is, however, remedied by, for example, modifying the k-shortest paths algorithm to add extra weight to the edges equivalent to the ones traversed in previously discovered paths. Such a modification leads to increased diversity in the results. The step distance, on the other hand, provides only very vague, general connections between the two subjects. The most is learned from these results is that computer vision and machine learning are both within the subject of artificial intelligence. Note that our method is actually able to find informative paths of significant length. While for the step distance the exponential number of possibilities for such paths quickly renders the retrieval infeasible, our method is still able to discriminate between the many choices. This is an important advantage provided by the method according to various embodiments, when applying this framework to biomedical databases, such as for example Linked Life Data. In such a database a user often tries to find non-obvious rather than long distance interactions between different genes and diseases to discover novel pathways while focusing on the most discriminative might save significant research time in this domain.

Therefore, the various embodiments present a novel metric that allows a user to solve two important information retrieval task in semantic networks efficiently. The metric depends only on the degrees of adjacent nodes, and shortest path search with such a metric will thus avoid unspecific, high degree nodes. This allows a user to find interesting neighbors of a query node and novel, specific links between entities, while only using standard graph algorithms.

Therefore to summarize, in accordance with various embodiments a method for information retrieval in semantic networks is proposed that comprises acquiring a graph of interest, assuming a metric regarding the acquired graph, specifying a query node of interest on the obtained graph, calculating a shortest-path distance from the query node of interest to a plurality of other nodes on the acquired graph, obtaining a ranked list of nodes based on the calculated shortest-path distance, and displaying for a user the retrieved information.

In accordance with another aspect according to various embodiments a method for information retrieval in semantic networks is proposed, comprising acquiring a graph of interest, assuming a metric regarding the acquired graph, specifying two distinct nodes on said acquired graph, calculating a plurality of k-shortest paths connecting said two distinct nodes in the assumed metric, obtaining a sequence of nodes in each of the k shortest paths, and displaying for a user the retrieved information.

In accordance with a further aspect according to various embodiments, a system for information retrieval in semantic networks is proposed, comprising at least a data bus system, a memory coupled to the data bus system, wherein the memory includes computer usable program code, a processing unit coupled to the data bus system, wherein the processing unit executes the computer usable program code to acquire a graph of interest, assume a metric regarding the acquired graph, specify a query node of interest on the obtained graph, calculate a shortest-path distance from the query node of interest to a plurality of other nodes on the acquired graph, obtain a ranked list of nodes based on the calculated shortest-path distance, and display for a user the retrieved information. The system for information retrieval in semantic networks proposed by various embodiments, may also comprise at least a data bus system, a memory coupled to the data bus system, wherein the memory includes computer usable program code, a processing unit coupled to the data bus system, wherein the processing unit executes the computer usable program code to acquire a graph of interest, assume a metric regarding the acquired graph, specify two distinct nodes on the acquired graph, calculate a plurality of k-shortest paths connecting the two distinct nodes in the assumed metric, obtaining a sequence of nodes in each of the k shortest paths, and displaying for a user the retrieved information.

In accordance with yet a further aspect according to various embodiments, a computer program product for information retrieval in semantic networks is proposed, comprising a tangible computer usable medium including computer usable program code for performing diagnosis detection in a system, the computer usable program code being used for acquiring a graph of interest, assuming a metric regarding the acquired graph, specifying a query node of interest on the obtained graph, calculating a shortest-path distance from the query node of interest to a plurality of other nodes on the acquired graph, obtaining a ranked list of nodes based on the calculated shortest-path distance, and displaying for a user the retrieved information. The computer program product for information retrieval in semantic networks, in accordance with various embodiments, also comprises a tangible computer usable medium including computer usable program code for performing diagnosis detection in a system, the computer usable program code being used for acquiring a graph of interest, assuming a metric regarding the acquired graph, specifying two distinct nodes on said acquired graph, calculating a plurality of k-shortest paths connecting said two distinct nodes in the assumed metric, obtaining a sequence of nodes in each of the k shortest paths, and displaying for a user the retrieved information.

In accordance with various embodiments, the method can further be characterised by the graph of interest being acquired by at least one of downloading, and constructing the graph from a collection of databases. If the graph is acquired via making an election based on the interest of the user, making an election based on the interest of the user is based on least one of a problem domain, and a search domain. The query node of interest is specified on the acquired graph via a search engine or it is manually chosen. The graph metric is defined via deg(u)+deg(v) or via log(deg(u))+log(deg(v)). The ranked list of nodes is ordered by the shortest distance in this metric to the query node.

The method for information retrieval in semantic networks according to various embodiments can further be characterized by the determination of the path between the two nodes describing the relationship between the two nodes.

As will be appreciated by one skilled in the art, the present disclosure may be embodied as a method, system or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

Therefore, in accordance with a further aspect according to various embodiments, a system for information retrieval in semantic networks is proposed, comprising at least a data bus system, a memory coupled to the data bus system, wherein the memory includes computer usable program code, a processing unit coupled to the data bus system, wherein the processing unit executes the computer usable program code to assume a metric regarding the acquired graph, specify a query node of interest on the obtained graph, calculate a shortest-path distance from the query node of interest to a plurality of other nodes on the acquired graph, obtain a ranked list of nodes based on the calculated shortest-path distance, and display for a user the retrieved information.

In accordance with yet a further aspect according to various embodiments, a computer program product for information retrieval in semantic networks is proposed, comprising a tangible computer usable medium including computer usable program code for performing diagnosis detection in a system, the computer usable program code being used for acquiring a graph of interest, assuming a metric regarding the acquired graph, specifying a query node of interest on the obtained graph, calculating a shortest-path distance from the query node of interest to a plurality of other nodes on the acquired graph, obtaining a ranked list of nodes based on the calculated shortest-path distance, and displaying for a user the retrieved information.

In accordance with yet a further aspect according to various embodiments, a system for information retrieval in semantic networks is proposed, comprising a data bus system, a memory coupled to the data bus system, wherein the memory includes computer usable program code, a processing unit coupled to the data bus system, wherein the processing unit executes the computer usable program code to acquire a graph of interest, assume a metric regarding the acquired graph, specify two distinct nodes on said acquired graph, calculate a plurality of k-shortest paths connecting the two distinct nodes in the assumed metric, obtain a sequence of nodes in each of the k shortest paths, and display for a user the retrieved information.

The various embodiments are also directed to a computer program product for information retrieval in semantic networks, comprising a tangible computer usable medium including computer usable program code for performing information retrieval in semantic networks, the computer usable program code for acquiring a graph of interest, assuming a metric regarding the acquired graph, specifying two distinct nodes on said acquired graph, calculating a plurality of k-shortest paths connecting said two distinct nodes in the assumed metric, obtaining a sequence of nodes in each of the k shortest paths, and displaying for a user the retrieved information.

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Referring now to the illustration of FIG. 2, FIG. 2 is a flow chart representation of the method for information retrieval in semantic networks, in accordance with an embodiment.

The method 200 for information retrieval in semantic networks comprises at least acquiring 202 a graph of interest, assuming 204 a metric regarding the acquired graph, specifying 206 a query node of interest on the obtained graph, calculating 208 a shortest-path distance from the query node of interest to a plurality of other nodes on the acquired graph, obtaining 210 a ranked list of nodes based on the calculated shortest-path distance, and displaying 212 for a user the retrieved information.

Referring now to the illustration of FIG. 3, FIG. 3 is a flow chart representation of the method for information retrieval in semantic networks, in accordance with another embodiment.

The method 300 comprises at least a method for information retrieval in semantic networks, comprising acquiring 302 a graph of interest, assuming 304 a step metric regarding the acquired graph, specifying 306 two distinct nodes on the acquired graph, calculating 308 a plurality of k-shortest paths connecting said two distinct nodes in the assumed metric; obtaining 310 a sequence of nodes in each of the k shortest paths, and displaying 312 for a user the retrieved information.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A computer program product in accordance with various embodiments comprises a tangible computer usable medium including computer usable program code for information retrieval in semantic networks, the computer usable program code for acquiring a graph of interest, assuming a metric regarding the acquired graph, specifying a query node of interest on the obtained graph, calculating a shortest-path distance from the query node of interest to a plurality of other nodes on the acquired graph, obtaining a ranked list of nodes based on the calculated shortest-path distance, and displaying for a user the retrieved information.

A computer program product that executes the method of information retrieval in semantic networks in a system according to various embodiments resides in an embedded hardware module in the studied devices. Alternatively, the computer program product may reside on a microcontroller, in a pre-compiled form. Alternatively, the computer program product may reside on a central computer, that may host all expert knowledge or be a combination of embedded at the site, and a central server.

FIG. 4 is an embodiment of a data processing system in which an embodiment of a system diagnosis detection application may be implemented. The data processing system of FIG. 4 may be located and/or otherwise operate at any node of a computer network, that may exemplarily comprise clients and/or servers, etc. In the embodiment illustrated in FIG. 4, data processing system 400 includes communications fabric 402, which provides communications between processor unit 404, memory 406, persistent storage 408, communications unit 410, input/output (I/O) unit 412, and display 414.

Processor unit 404 serves to execute instructions for software that may be loaded into memory 406. Processor unit 404 may be a set of one or more processors or may be a multiprocessor core, depending on the particular implementation. Further, processor unit 404 may be implemented using one or more heterogeneous processor systems in which a main processor is present with secondary processors on a single chip. As another illustrative example, processor unit 404 may be a symmetric multi-processor system containing multiple processors of the same type.

In some embodiments, memory 406 may be a random access memory or any other suitable volatile or non-volatile storage device. Persistent storage 408 may take various forms depending on the particular implementation. For example, persistent storage 408 may contain one or more components or devices. Persistent storage 408 may be a hard drive, a flash memory, a rewritable optical disk, a rewritable magnetic tape, or some combination of the above. The media used by persistent storage 408 also may be removable such as, but not limited to, a removable hard drive.

Communications unit 410 provides for communications with other data processing systems or devices. In these examples, communications unit 410 is a network interface card. Modems, cable modem and Ethernet cards are just a few of the currently available types of network interface adapters. Communications unit 410 may provide communications through the use of either or both physical and wireless communications links.

Input/output unit 412 enables input and output of data with other devices that may be connected to data processing system 400. In some embodiments, input/output unit 412 may provide a connection for user input through a keyboard and mouse. Further, input/output unit 412 may send output to a printer. Display 414 provides a mechanism to display information to a user.

Instructions for the operating system and applications or programs are located on persistent storage 408. These instructions may be loaded into memory 406 for execution by processor unit 404. The processes of the different embodiments may be performed by processor unit 404 using computer implemented instructions, which may be located in a memory, such as memory 406. These instructions are referred to as program code, computer usable program code, or computer readable program code that may be read and executed by a processor in processor unit 404. The program code in the different embodiments may be embodied on different physical or tangible computer readable media, such as memory 406 or persistent storage 408.

Program code 416 is located in a functional form on computer readable media 418 that is selectively removable and may be loaded onto or transferred to data processing system 400 for execution by processor unit 404. Program code 416 and computer readable media 418 form computer program product 420 in these examples. In one example, computer readable media 418 may be in a tangible form, such as, for example, an optical or magnetic disc that is inserted or placed into a drive or other device that is part of persistent storage 408 for transfer onto a storage device, such as a hard drive that is part of persistent storage 408. In a tangible form, computer readable media 418 also may take the form of a persistent storage, such as a hard drive, a thumb drive, or a flash memory that is connected to data processing system 400. The tangible form of computer readable media 418 is also referred to as computer recordable storage media. In some instances, computer readable media 418 may not be removable.

Alternatively, program code 416 may be transferred to data processing system 400 from computer readable media 418 through a communications link to communications unit 410 and/or through a connection to input/output unit 412. The communications link and/or the connection may be physical or wireless in the illustrative examples. The computer readable media also may take the form of non-tangible media, such as communications links or wireless transmissions containing the program code.

The different components illustrated for data processing system 400 are not meant to provide architectural limitations to the manner in which different embodiments may be implemented. The different illustrative embodiments may be implemented in a data processing system including components in addition to or in place of those illustrated for data processing system 400. Other components shown in FIG. 4 can be varied from the illustrative examples shown. For example, a storage device in data processing system 400 is any hardware apparatus that may store data. Memory 406, persistent storage 408, and computer readable media 418 are examples of storage devices in a tangible form.

Accordingly, the disclosed embodiments present a model, method and computer program product for information retrieval in semantic networks. The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

In addition, the flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

TABLE 1

Basic statistics of the used datasets.

| | DBPedia | OpenCyc |
| --- | --- | --- |
| Vertices | 3,660,898 | 150,088 |
| Edges | 8,947,631 | 554,762 |
| Average degree | 4.88 | 7.39 |

TABLE 2

Top 30 results of neighborhood search for query node "Espresso" in DBpedia, along with the distances from the query node. First, Step means shortest path finding with the step distance; then follows the approach proposed by various embodiments, and the last column shows the results of our simple approximation of the commute distance. Entities marked with (C) represent skos categories, other items are regular DBpedia resources.

| Step | Approach proposed by various embodiments | | Approx. Commute | |
| --- | --- | --- | --- | --- |
| Espresso | 0 Espresso | 0 | Espresso | 0 |
| (C)Italian beverages | 1 (C)Italian beverages | 4.5 | (C)Italian loanwords | 1295.75 |
| (C)Italian loanwords | 1 (C)Coffee beverages | 5.05 | (C)Coffee beverages | 1296.86 |
| (C)Coffee beverages | 1 (C)Italian loanwords | 6.09 | (C)Italian beverages | 1297.35 |
| (C)Italian cuisine | 2 Bombardino | 7.9 | (C)Italian cuisine | 1339.5 |
| (C)Italian words and phrases | 2 Caffe corretto | 8.59 | (C)Opera terminology | 1401.79 |
| (C)Italian language | 2 Grappa | 8.59 | (C)Italian words and phrases | 1452.94 |
| (C)English words foreign origin | 2 Torani | 8.59 | (C)Pasta | 1467.75 |
| (C)Romance loanwords | 2 Lemonsoda | 8.59 | (C)Mediterranean cuisine | 1529.31 |
| (C)Beverages by region | 2 Oransoda | 8.59 | (C)Cuisine by nationality | 1544.99 |
| (C)Italian alcoholic beverages | 2 Pelmosoda | 8.59 | (C)Opera genres | 1582.18 |
| (C)Coffee preparation | 2 Beverly (drink) | 8.59 | (C)Opera | 1584.02 |
| Castrato | 2 Doppio | 8.59 | (C)Performing arts | 1599.79 |

TABLE 2-continued

Top 30 results of neighborhood search for query node "Espresso" in DBpedia, along with the distances from the query node. First, Step means shortest path finding with the step distance; then follows the approach proposed by various embodiments, and the last column shows the results of our simple approximation of the commute distance. Entities marked with (C) represent skos categories, other items are regular DBpedia resources.

| Step | Approach proposed by various embodiments | | Approx. Commute | |
|---|---|---|---|---|
| Da capo | 2 | Caffe | 9 | (C)Musical notation | 1601.59 |
| Graffiti | 2 | Chinotto | 9 | (C)European cuisine | 1664.97 |
| Glissando | 2 | Ammazzacaffe | 9 | (C)Italian language | 1685.92 |
| Macaroni | 2 | Stappj | 9 | Turkish coffee | 1691.75 |
| Mozzarella | 2 | Galvanina | 9 | (C)Beverages by region | 1721.4 |
| Opera | 2 | Irish coffee | 9 | (C)Dried meat | 1737.1 |
| Pasta | 2 | Cortado | 9 | (C)Musical theatre | 1740.42 |
| Pizza | 2 | Iced coffee | 9 | (C)Music | 1743.96 |
| Spaghetti | 2 | Pepsi Kona | 9 | (C)Articulations | 1756.06 |
| Tempo | 2 | Flat white | 9 | (C)English words foreign origin | 1756.7 |
| Cappuccino | 2 | Mochasippi | 9 | (C)Singing | 1760.76 |
| Legato | 2 | Red eye (drink) | 9 | (C)Salumi | 1764.59 |
| Staccato | 2 | Liqueur coffee | 9 | (C)Croatian cuisine | 1769.7 |
| Operetta | 2 | Lungo | 9 | (C)Entertainment | 1773.37 |
| Cadenza | 2 | Caffe Americano | 9 | (C)Theatrical genres | 1788.05 |
| Concerto | 2 | Espresso con panna | 9 | (C)Italian culture | 1795.82 |
| Cantata | 2 | Caffe breve | 9 | (C)Italian prod. protected origin | 1799.13 |

TABLE 3

Top 30 results of neighborhood search for query node "iPod" in DBpedia.

| Step | | Approach proposed by various embodiments | | Approx. Commute | |
|---|---|---|---|---|---|
| IPod | 0 | IPod | 0 | IPod | 0 |
| (C)2001 introductions | 1 | (C)IPod | 4.97 | (C)ITunes | 695.93 |
| (C)IPod | 1 | (C)Industrial designs | 5.78 | (C)Portable media players | 698.52 |
| (C)Portable media players | 1 | (C)ITunes | 5.98 | (C)Digital audio players | 750.23 |
| (C)ITunes | 1 | (C)2001 introductions | 6.29 | (C)IPhone OS software | 757.78 |
| (C)IPhone OS software | 1 | (C)Portable media players | 6.49 | (C)IPod | 784.31 |
| (C)Industrial designs | 1 | (C)IPhone OS software | 6.52 | (C)Industrial designs | 857.01 |
| (C)2001 | 2 | IPod click wheel | 8.15 | (C)Smartphones | 889.69 |
| (C)Apple Inc. software | 2 | IPod Photo | 8.84 | (C)2001 introductions | 907.63 |
| (C)Industrial design | 2 | List of iPod models | 8.84 | (C)Mac OS X software | 929.97 |
| (C)Windows software 2 players | 2 | Dock Connector | 8.84 | (C)Touchscreen portable media | 955.66 |
| (C)Software by operating system | 2 | IPod Mini | 9.25 | (C)Consumer electronics brands | 959.29 |
| (C)Apple Inc. hardware | 2 | IPod advertising | 9.25 | (C)Apple Inc. software | 973.22 |
| (C)Windows media players | 2 | IPhone Touch | 9.25 | (C)IPhone | 974.07 |
| (C)Mac OS X software | 2 | IPod Nano | 9.53 | (C)2007 introductions | 1010.71 |
| (C)Digital audio players | 2 | Neistat Brothers | 9.53 | IPhone | 1025.22 |
| (C)USA PATRIOT Act | 2 | IPod Classic | 9.53 | (C)IPhone OS | 1031.79 |
| (C)MPEG | 2 | Ipod + HP | 9.53 | (C)Web 2.0 | 1035.86 |
| (C)IPod accessories | 2 | List of iPhone OS devices | 9.53 | (C)Windows software | 1047.63 |
| (C)IPod software | 2 | IPod Shuffle | 9.76 | ITunes | 1049.63 |
| (C)21st-century introductions | 2 | Juicy Salif | 9.77 | (C)Apple Inc. hardware | 1057.46 |
| (C)ITunes-exclusive releases | 2 | DADVSI | 10.09 | (C)Software by operating system | 1075.57 |
| (C)IPhone OS games | 2 | NextWorth Solutions | 10.09 | networking | 1096.2 |
| (C)Mac OS X media players | 2 | IMix | 10.17 | (C)Mac OS software | 1096.22 |
| (C)Apple Inc. peripherals | 2 | Genius (iTunes) | 10.17 | (C)Personal digital assistants | 1112.79 |
| (C)Apple Inc. services | 2 | AirTunes | 10.17 | (C)Brands | 1126.36 |
| (C)Vehicles introduced in 2001 | 2 | ITunes law | 10.17 | (C)Media players | 1126.94 |

TABLE 3-continued

Top 30 results of neighborhood search for query node "iPod" in DBpedia.

| Step | Approach proposed by various embodiments | | Approx. Commute | |
|---|---|---|---|---|
| (C)IPhone | 2 | ITunes Music Store | 10.17 | (C)Creative Technology products | 1129.28 |
| (C)2001 comic debuts | 2 | ITunes U | 10.17 | (C)IPod software | 1151.43 |
| (C)IPhone OS | 2 | ITunes Applications | 10.17 | Nimbuzz | 1156.45 |

TABLE 4

Top 30 results of neighborhood search for query node "machine learning" in OpenCyc.

| Step | Approach proposed by various embodiments | | Approx. Commute | |
|---|---|---|---|---|
| machine learning | 0 | machine learning | 0 | machine learning | 0 |
| temporal stuff also a durative event | 1 | machine rule induction | 2.48 | first-order collection | 875.61 |
| computer activity | 1 | discriminative weight learning | 2.89 | temp stuff also a durative event | 887.91 |
| discriminative weight learning | 1 | generative weight learning | 2.89 | computer activity | 897.63 |
| generative weight learning | 1 | MLN Generated Using Learning Type | 3.18 | temporal stuff | 921.03 |
| machine rule induction | 1 | computer activity | 6.27 | employee computer activity type | 1061.05 |
| MLN Generated Using Learning Type | 2 | markov logic network | 6.87 | computer activity type | 1090.34 |
| Alcoholism | 2 | temporal stuff also a durative event | 7.75 | athletic activity | 1104.59 |
| burning 2 physical | 2 | MLN Data File Pathname | 9.86 | information transfer | 1115.24 |
| flowing | 2 | MLN File Pathname | 9.86 | biological transportation | 1138.37 |
| anthem | 2 | MLN Generated Using Cmd String | 9.86 | body movement | 1152.19 |
| the union of ensemble showman | 2 | MLN Rule File Pathname | 9.86 | recreational activity | 1169.12 |
| playing | 2 | MLN Type Const Dec File Pathname | 9.86 | using a computer | 1181.74 |
| halt | 2 | MLN Represented By Microtheory | 10.27 | information-accessing event | 1195.75 |
| rock climbing | 2 | Content Of MLN Fn | 10.56 | physical event | 1196.47 |
| snow-skiing | 2 | computer activity that computer did | 11.85 | structured information source | 1213.39 |
| Iter. Event Scene Fn id veg. 1-3 km | 2 | computer activity that person did | 11.85 | type of accomplishment | 1236.74 |
| rafting | 2 | hack | 11.85 | individual | 1239.97 |
| candy making | 2 | computer thread | 11.85 | computer editing | 1256.46 |
| composting | 2 | help desk session | 11.85 | internet activity | 1266.56 |
| woodworking | 2 | network packet filtering | 11.85 | running computer process | 1280.32 |
| diagnosis of Wegeners granulomatosis | 2 | network packet routing | 11.85 | locomotion event | 1280.92 |
| breast cancer treatment | 2 | opening presents | 11.85 | ride | 1303.08 |
| AIDS treatment | 2 | packet sniffing | 11.85 | CW instantiating | 1313.32 |
| acne care 2 unnatural Affliction procedure | 2 | partitioning a disk | 11.85 | thing | 1315.36 |
| allergic reaction treatment | 2 | placing a residual malicious program | 11.85 | biological process | 1321.43 |
| atrial septal aneurysm med treatment | 2 | browser requests a secure connection | 12.13 | QA clarifying collection type | 1338.81 |
| | 2 | locking computer display | 12.13 | internet communication | 1355.33 |

TABLE 4-continued

Top 30 results of neighborhood search for query
node "machine learning" in OpenCyc.

| Step | | Approach proposed by various embodiments | | Approx. Commute | |
|---|---|---|---|---|---|
| Most autistic procedure | 2 | website maintenance | 12.13 | network propagation | 1357.71 |
| vision impairment treatment | 2 | network prop. malicious program | 12.13 | candidate KB completeness node | 1360.95 |

TABLE 5

Top 30 results of neighborhood search for query node
"quantum physics" in the OpenCyc dataset.

| Step | | Approach proposed by various embodiments | | Approx. Commute | |
|---|---|---|---|---|---|
| quantum physics | 0 | quantum physics | 0 | quantum physics | 0 |
| scientific discipline | 1 | Wn 20synsetqtm physnoun | 12.77 | scientific discipline | 737.59 |
| science | 1 | quantum chromodynamics | 3.69 | science | 784.58 |
| word net workflow const | 1 | quantum electrodynamics | 3.69 | quantum field theory | 865.5 |
| physics | 1 | quantum field theory | 4.16 | physics | 894.12 |
| quantum chromodynamics | 1 | physics | 5.72 | word net workflow const | 991.39 |
| quantum electrodynamics | 1 | Wn 20synsetqtm field thynoun | 16.93 | first-order collection | 996.48 |
| quantum field theory | 1 | scientific discipline | 7.44 | quantum chromodynamics | 1037.64 |
| Wn 20synsetquantum physicsnoun 1 | 1 | science | 7.83 | quantum electrodynamics | 1037.64 |
| acquiring a platinum card | 2 | word net workflow const | 9.75 | type of object | 1143.11 |
| calcium atom | 2 | Wn 20synsetphysicsnoun 1 | 10.05 | field of study | 1233.23 |
| gold atom | 2 | plasma physics | 10.45 | outfitting | 1342.35 |
| trying to find an object | 2 | organic physics | 10.45 | event | 1565.3 |
| court | 2 | field concerning Newtonian physics | 10.45 | attempt to do something | 1627.31 |
| attempt to perform a sale | 2 | acoustics | 10.45 | uniting | 1639.56 |
| attending school at university | 2 | aerodynamics | 10.45 | pathology | 1661.99 |
| bachelors degree in engineering | 2 | atmospheric physics | 10.45 | plasma physics | 1728.32 |
| BS degree in library & info science | 2 | chaos theory | 10.45 | headline | 1729.59 |
| B.S.M. | 2 | computational structural mechanics | 10.45 | encouraging | 1732.29 |
| Becoming Fn law 2 | | condensed matter physics | 10.45 | creation event | 1759.97 |
| clearing | 2 | cosmology | 10.45 | struggling | 1823.27 |
| clear | 2 | fluid dynamics | 10.45 | bringing about | 1830.24 |
| believer in atheism | 2 | optics | 10.45 | commanding | 1855.94 |
| believer in Islamism | 2 | particle physics | 10.45 | oozing | 1855.94 |
| nationalist | 2 | solid mechanics | 10.45 | gathering | 1868.81 |
| Shiite | 2 | statistical mechanics | 10.45 | pathology | 1892.6 |
| Brain Cancer | 2 | tribology | 10.45 | asset | 1893.29 |
| Breast Cancer | 2 | cosmology relativity theory | 10.74 | dragooning | 1934.18 |
| Liver Cancer | 2 | crystallography | 10.74 | boundary | 1934.18 |
| Marrow Cancer | 2 | general relativity theory | 10.74 | pathology | 1966.17 |

TABLE 6

The five shortest paths connecting the nodes "Natural
language processing" and "Machine learning"
in the DBPedia dataset using the metric proposed
by various embodiments.

Path 1 (distance 23.26)
Natural language processing
(C)Natural language
processing
(C)Word sense disambiguation
Bootstrapping (machine
learning)
(C)Learning in computer
vision
Machine learning Path 2 (distance 23.53)
Natural language processing
(C)Computational linguistics
(C)Word sense disambiguation
Bootstrapping (machine
learning)
(C)Learning in computer
vision
Machine learning Path 3 (distance 24.55)
Natural language processing
Bag of words model
(C)Natural language
processing
(C)Machine learning
Machine learning Path 4 (distance 25.63)
Natural language processing
Analogical modelling
(C)Computational linguistics
(C)Machine learning
Machine learning Path 5 (distance 26.03)
Natural language processing
(C)Natural language processing
Automatic Acquisition of Sense-Tagged Corpora
(C)Word sense disambiguation
Bootstrapping (machine learning)
(C)Learning in computer vision
Machine learning

TABLE 7

Shortest path finding between the terms "Computer vision"
and "machine learning" in DBpedia.

In accordance with the approach proposed by various
embodiments:

Path 1 (length 15.2407): Computer vision - (C) Computer
vision - (C) Learning in computer vision - Machine learning
Path 2 (length 22.1722): Computer vision - (C) Computer
vision - (C) Object recognition and categorization
Boosting methods for object categorization - (C) Learning
in computer vision - Machine learning
Path 3 (length 22.4706): Computer vision - (C) Artificial
intelligence - (C)Cybernetics - Machine learning
Path 4 (length 23.5585): Computer vision - (C) Computer
vision - Segmentation based object categorization - (C)
Object recognition and categorization - Boosting methods
for object categorization - (C) Learning in computer
vision - Machine learning
Path 5 (length 23.5585): Computer vision - (C) Computer
vision - Object recognition (computer vision) - (C)
Object recognition and categorization - Boosting methods
for object categorization - (C) Learning in computer
vision - Machine learning Step Distance:

Path 1 (length 3): Computer vision - (C) Artificial
intelligence - (C) Machine learning - Machine learning
Path 2 (length 3): Computer vision - (C) Computer vision -
(C) Learning in computer vision - Machine learning
Path 3 (length 3): Computer vision - (C) Artificial
intelligence - (C) Cybernetics - Machine learning
Path 4 (length 4): Computer vision - (C) Artificial
intelligence - (C) Machine learning - (C) Learning -
Machine learning
Path 5 (length 4): Computer vision - (C) Computer vision -
(C)Artificial intelligence - (C) Machine learning -
Machine learning

What is claimed is:

1. A method for information retrieval in semantic networks, comprising:
acquiring a graph of interest;
assuming a metric regarding the acquired graph, wherein said metric assigns to each edge in the acquired graph a weight that is dependent on degrees of its endpoints;
specifying a query node of interest on the acquired graph;
calculating a shortest-path distance from the query node of interest to a plurality of other nodes on the acquired graph;
obtaining a ranked list of nodes based on the calculated shortest-path distance, and
displaying for a user the retrieved information.

2. The method for information retrieval in semantic networks according to claim 1, wherein the graph of interest is acquired by at least one of downloading, and constructing said graph from a collection of databases.

3. The method for information retrieval in semantic networks according to claim 1, wherein said query node of interest is specified on the acquired graph via a search engine.

4. The method for information retrieval in semantic networks according to claim 1, wherein said metric is calculated via $\deg(u)+\deg(v)$, wherein $\deg(u)$ is the degree of the node u, and $\deg(v)$ is the degree of node v.

5. The method for information retrieval in semantic networks according to claim 1, wherein said metric is calculated via $\log(\deg(u))+\log(\deg(v))$, wherein $\deg(u)$ is the degree of the node u, and $\deg(v)$ is the degree of node v.

6. The method for information retrieval in semantic networks according to claim 1, wherein the graph metric is defined via $\deg(u)+\deg(v)$ or via $\log(\deg(u))+\log(\deg(v))$, wherein $\deg(u)$ is the degree of the node u, and $\deg(v)$ is the degree of node v.

7. The method for information retrieval in semantic networks according to claim 1, wherein the shortest-path distance from the query node to all other nodes for the first task is computed using Dijkstra algorithm.

8. A method for information retrieval in semantic networks, comprising:
acquiring a graph of interest;
assuming a metric regarding the acquired graph, wherein said metric assigns to each edge in the acquired graph a weight that is dependent on degrees of its endpoints;
specifying two distinct nodes on said acquired graph;
calculating a plurality of k-shortest paths connecting said two distinct nodes in the assumed metric;
obtaining a sequence of nodes in each of the k shortest paths, and
displaying for a user the retrieved information.

9. The method for information retrieval in semantic networks of claim 8, wherein the determination of the path between the two nodes describes the relationship between the two nodes.

10. A system for information retrieval in semantic networks, comprising:
a data bus system;
memory coupled to the data bus system,
wherein the memory includes computer usable program code;
a processing unit coupled to the data bus system,
wherein the processing unit is operable to execute the computer usable program code to:
assume a metric regarding an acquired graph, wherein said metric assigns to each edge in the acquired graph a weight that is dependent on degrees of its endpoints;
specify a query node of interest on the acquired graph;

calculate a shortest-path distance from the query node of interest to a plurality of other nodes on the acquired graph;

obtain a ranked list of nodes based on the calculated shortest-path distance, and display for a user the retrieved information.

11. The system according to claim 10, wherein the processing unit is further operable to execute the computer usable program code to acquire the graph of interest by at least one of downloading, and constructing said graph from a collection of databases.

12. The system according to claim 10, wherein said query node of interest is specified on the acquired graph via a search engine.

13. The system according to claim 10, wherein the processing unit is further operable to execute the computer usable program code to calculate said metric via deg(u)+deg(v), wherein deg(u) is the degree of the node u, and deg(v) is the degree of node v.

14. The system according to claim 10, wherein the processing unit is further operable to execute the computer usable program code to calculate said metric via log(deg(u))+log(deg(v)), wherein deg(u) is the degree of the node u, and deg(v) is the degree of node v.

15. The system according to claim 10, wherein the graph metric is defined via deg(u)+deg(v) or via log(deg(u))+log(deg(v)), wherein deg(u) is the degree of the node u, and deg(v) is the degree of node v.

16. The system according to claim 10, wherein the processing unit is further operable to execute the computer usable program code to compute the shortest-path distance from the query node to all other nodes for the first task using Dijkstra algorithm.

17. A computer program product for information retrieval in semantic networks, comprising:

a tangible computer usable medium including nontransitory computer usable program code for performing information retrieval in semantic networks, the computer usable program code being used for:

acquiring a graph of interest;

assuming a metric regarding the acquired graph, wherein said metric assigns to each edge in the acquired graph a weight that is dependent on degrees of its endpoints;

specifying a query node of interest on the acquired graph;

calculating a shortest-path distance from the query node of interest to a plurality of other nodes on the acquired graph;

obtaining a ranked list of nodes based on the calculated shortest-path distance, and displaying for a user the retrieved information.

18. A system for information retrieval in semantic networks, comprising:

a data bus system;

memory coupled to the data bus system, wherein the memory includes computer usable program code;

a processing unit coupled to the data bus system, wherein the processing unit executes the computer usable program code to:

acquire a graph of interest;

assume a metric regarding the acquired graph, wherein said metric assigns to each edge in the acquired graph a weight that is dependent on degrees of its endpoints;

specify two distinct nodes on said acquired graph;

calculate a plurality of k-shortest paths connecting said two distinct nodes in the assumed metric;

obtain a sequence of nodes in each of the k shortest paths, and display for a user the retrieved information.

19. A computer program product for information retrieval in semantic networks, comprising:

a tangible computer usable medium including nontransitory computer usable program code for performing information retrieval in semantic networks, the computer usable program code being used for:

acquiring a graph of interest;

assuming a metric regarding the acquired graph, wherein said metric assigns to each edge in the acquired graph a weight that is dependent on degrees of its endpoints;

specifying two distinct nodes on said acquired graph;

calculating a plurality of k-shortest paths connecting said two distinct nodes in the assumed metric;

obtaining a sequence of nodes in each of the k shortest paths, and displaying for a user the retrieved information.

* * * * *